US008955331B2

(12) United States Patent
Moehrle et al.

(10) Patent No.: US 8,955,331 B2
(45) Date of Patent: Feb. 17, 2015

(54) TURBINE COMBUSTION SYSTEM COUPLING WITH ADJUSTABLE WEAR PAD

(75) Inventors: Frank Moehrle, Palm City, FL (US); John Pula, Jupiter, FL (US); Jeremy Lefler, Stuart, FL (US); Martin Konen, Palm Beach Gardens, FL (US)

(73) Assignee: Siemens Energy, Inc., Orlando, FL (US)

( * ) Notice: Subject to any disclaimer, the term of this patent is extended or adjusted under 35 U.S.C. 154(b) by 722 days.

(21) Appl. No.: 13/279,442

(22) Filed: Oct. 24, 2011

(65) Prior Publication Data

US 2012/0291437 A1 Nov. 22, 2012

Related U.S. Application Data

(60) Provisional application No. 61/488,243, filed on May 20, 2011.

(51) Int. Cl.

| | |
|---|---|
| ***F02C 1/00*** | (2006.01) |
| ***F02G 3/00*** | (2006.01) |
| ***F23R 3/00*** | (2006.01) |
| ***F23R 3/60*** | (2006.01) |
| ***F01D 9/02*** | (2006.01) |

(52) U.S. Cl.

CPC ................ *F23R 3/005* (2013.01); *F23R 3/002* (2013.01); *F23R 3/60* (2013.01); *F01D 9/023* (2013.01); *F23R 2900/00017* (2013.01); *F23R 2900/00012* (2013.01); *F23R 2900/03044* (2013.01); *F05D 2230/642* (2013.01); *F05D 2230/644* (2013.01)

USPC .................. 60/752; 60/754; 60/755; 60/756; 60/757; 60/758; 60/760; 60/772

(58) Field of Classification Search

USPC .................................. 60/752–760, 722, 772

See application file for complete search history.

(56) References Cited

U.S. PATENT DOCUMENTS

| | | | | |
|---|---|---|---|---|
| 6,341,485 | B1 | 1/2002 | Liebe | |
| 6,901,757 | B2 | 6/2005 | Gerendas | |
| 7,546,743 | B2 * | 6/2009 | Bulman et al. | 60/796 |
| 7,647,779 | B2 * | 1/2010 | Shi et al. | 60/800 |
| 7,681,403 | B2 | 3/2010 | Johnson et al. | |
| 2003/0089115 | A1 | 5/2003 | Gerendas | |
| 2009/0260364 | A1 * | 10/2009 | Keller et al. | 60/753 |
| 2010/0225902 | A1 | 9/2010 | Bagley et al. | |

FOREIGN PATENT DOCUMENTS

| | | | |
|---|---|---|---|
| EP | 1847685 | A2 | 10/2007 |

* cited by examiner

*Primary Examiner* — Craig Kim

(57) ABSTRACT

A nut (64) is affixed to an outer surface of a transition impingement sleeve forward ring (50) that encircles, and is affixed to, a forward end (44) of a tubular transition impingement sleeve (45). The nut has a threaded hole (63) aligned with a hole (66) in the impingement sleeve forward ring. A machine screw (68) is threaded into the nut and extends through the hole (66), and has a radially inner end with a wear pad (70), and a radially outer end with a turning tool engagement element (72). The wear pad contacts an outer surface of an aft portion of a transition piece forward outer ring (52) that is surrounded by the transition impingement sleeve forward ring (50). The rotational position of the machine screw (68) sets a radial gap (76) between the transition impingement sleeve forward ring and the transition piece forward outer ring.

17 Claims, 5 Drawing Sheets

TURBINE COMBUSTION SYSTEM COUPLING WITH ADJUSTABLE WEAR PAD

This application claims benefit of the 20 May 2011 filing date of U.S. Application No. 61/488,243 which is incorporated by reference herein.

FIELD OF THE INVENTION

This invention relates to a coupling that allows relative axial movement, including thermal growth, between a combustion chamber structure and a transition duct assembly of a gas turbine engine, and more particularly to the establishment of a radial gap between the two structures that is set and maintained by the coupling.

BACKGROUND OF THE INVENTION

The combustion system of a gas turbine contains the hot gasses and flame produced during the combustion process and channels the hot gas to the turbine section of the engine. An industrial gas turbine engine commonly has several individual combustion device assemblies arranged in a circular array about the engine shaft. A respective circular array of transition ducts, also known as transition pieces, connects the outflow of each combustion chamber to the inlet of the turbine section. Each transition piece may be a tubular structure that channels the combustion gas between a combustion chamber and the first row of stationary vanes of the turbine section.

The transition piece may include, a tubular inner liner or body that provides a flow path for the combustion gas, which may reach temperatures up to about 1500° C. The liner may be cooled by compressed air diverted from the turbine compressor. An impingement sleeve may surround the inner liner of the transition piece. This provides a dual-wall enclosure for the combustion gas path. The impingement sleeve may include holes that admit the coolant and direct it onto an exterior surface of the inner liner to cool the liner.

BRIEF DESCRIPTION OF THE DRAWINGS

The invention is explained in the following description in view of the drawings that show.

DETAILED DESCRIPTION OF THE INVENTION

Figure 1:
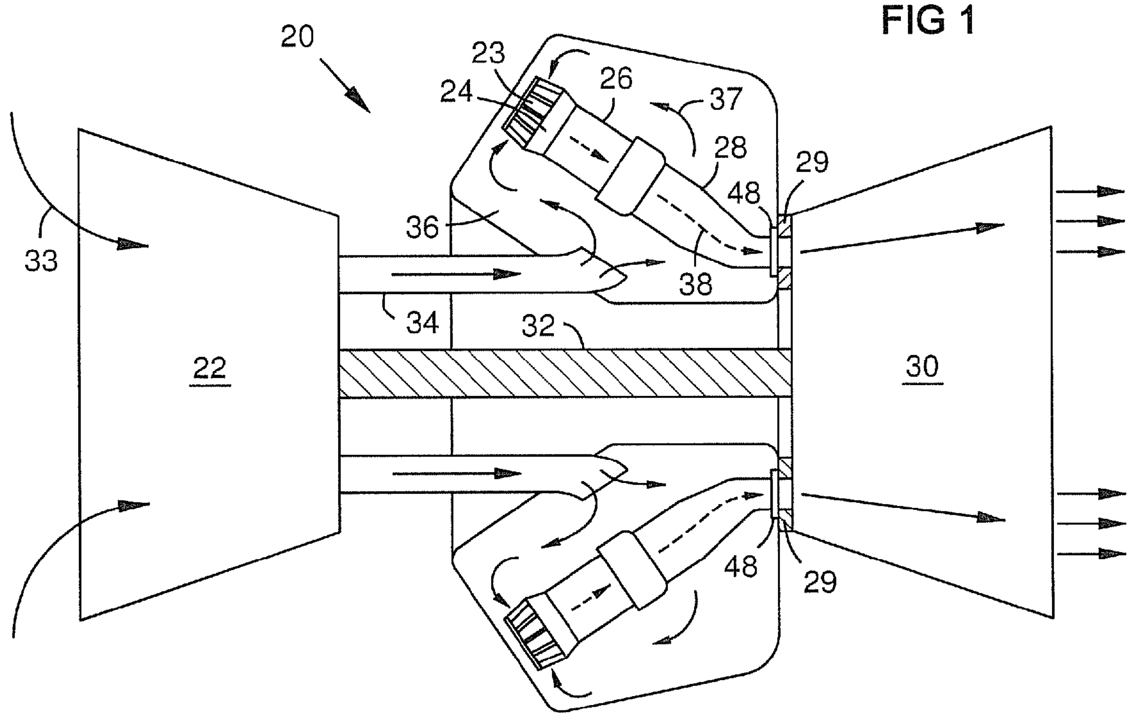
FIG. 1 is a schematic view of a gas turbine as may incorporate aspects of the invention.

FIG. 1 is a schematic view of a gas turbine engine 20 that includes a compressor 22, fuel injectors 24 that may also be referred to generally as cap assemblies, combustion chambers 26, transition pieces 28, a turbine section 30 and an engine shaft 32 by which the turbine drives the compressor. Several combustor assemblies 24, 26, 28 may be arranged in a circular array in a can-annular design. During operation, the compressor 22 intakes air 33 and provides a flow of compressed air 37 to the combustor inlets 23 via a diffuser 34 and a combustor plenum 36. The fuel injectors 24 mix fuel with the compressed air. This mixture burns in the combustion chamber 26 producing hot combustion gas 38, also called the working gas, which passes through the transition piece 28 to the turbine 30 via a sealed connection between an exit frame 48 of the transition piece 28 and the turbine inlet hardware 29. The diffuser 34 and the plenum 36 may extend annularly about the engine shaft 32. The compressed airflow 37 in the combustor plenum 36 has higher pressure than the working gas 38 in the combustion chamber 26 and in the transition piece 28.

Figure 2:
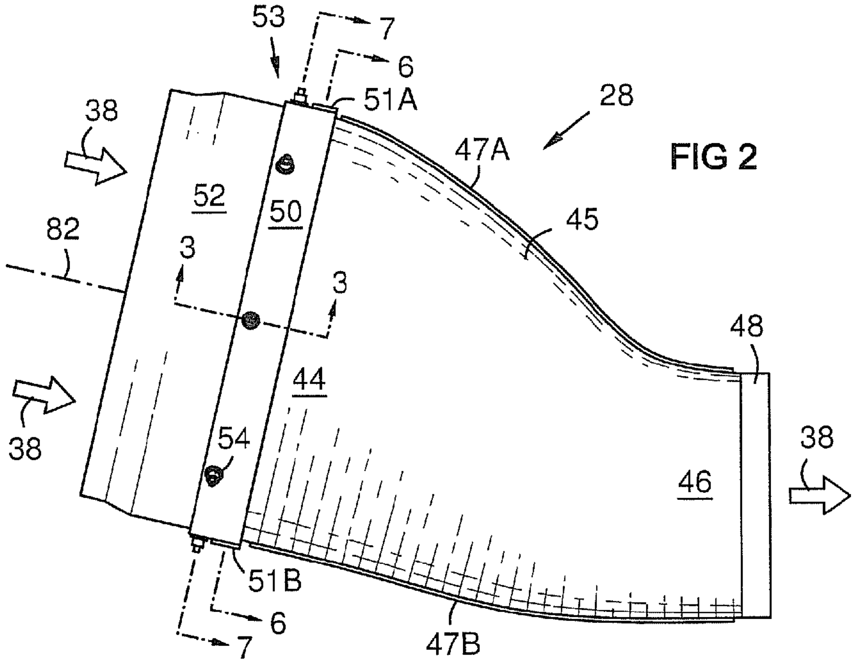
FIG. 2 is a side view of a combustion system transition piece per aspects of the invention.

FIG. 2 is a side view of a transition piece 28 of FIG. 1, which may be a dual-walled enclosure bounding the working gas flow 38. The outer wall or impingement sleeve 45 may be formed in two halves (later shown) divided, for example, along a vertical axial plane, which may include a coupling centerline 82. These halves may be welded together along opposite seams using respective seal strips 47A, 47B. An exit frame 48 may be attached to the downstream end of the transition piece 28 by welding or other means, and may then be attached to the turbine inlet hardware 29 by bolts or other means, thus supporting the downstream end of the transition piece 28. The upstream or forward end 44 of the transition impingement sleeve 45 may be circular, and the downstream end 46 may be approximately rectangular with curvature to match the turbine inlet hardware 29.

Figure 7:
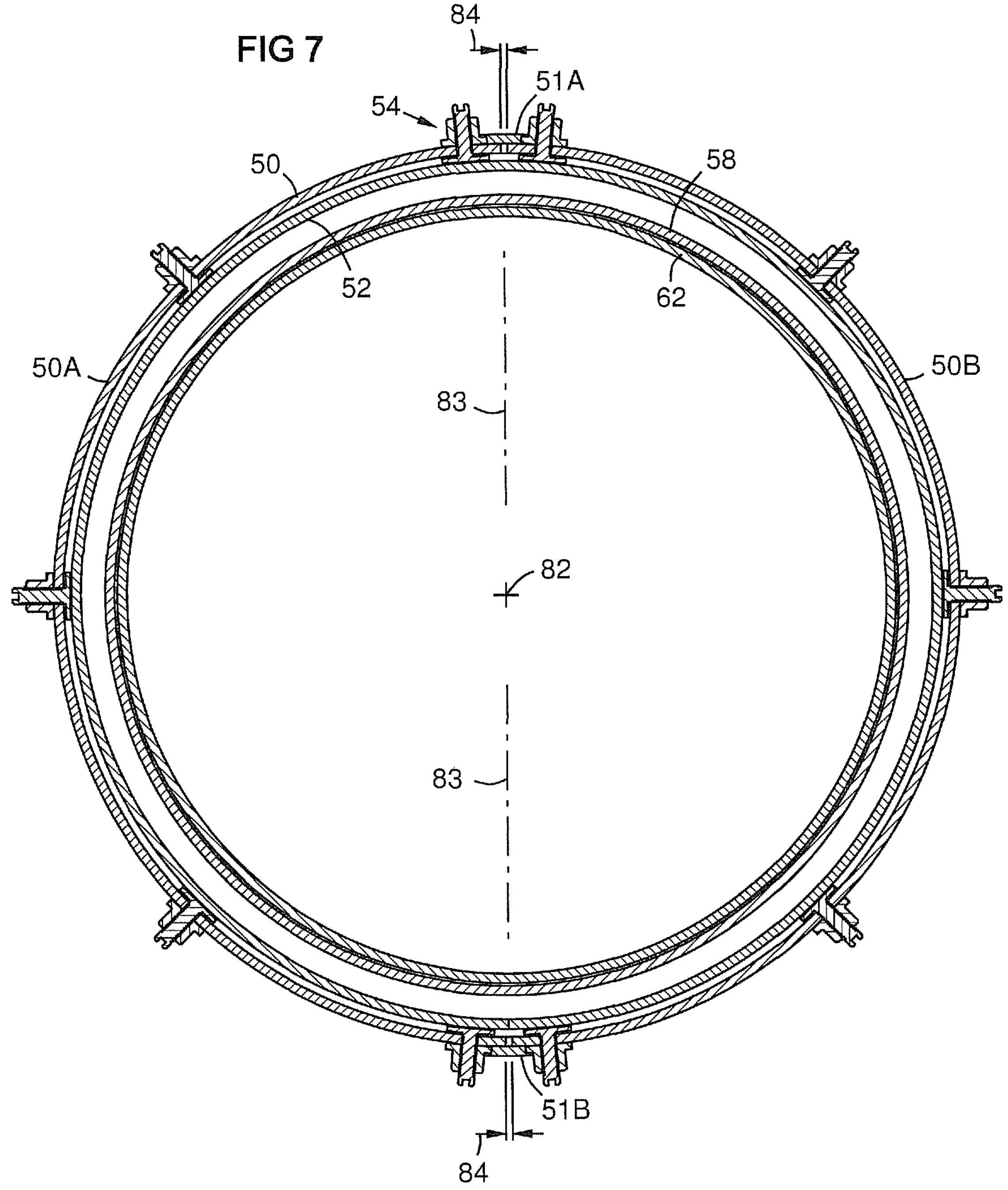
FIG. 7 is a sectional view taken along line 7-7 of FIG. 2, showing a circular array of wear pad adjusters installed on an impingement sleeve forward ring.

According to at least one exemplary embodiment of the invention, an impingement sleeve forward ring 50 may encircle and be affixed to the forward end 44 of the transition impingement sleeve 45. Forward ring 50 may be formed in two semi-cylindrical segments (later shown) being divided, for example, along a vertical axial plane. The two segments may be welded together at opposite seams using respective seal plates 51A, 51B. A transition piece forward outer ring 52 may slidably engage within the impingement sleeve forward ring 50 via wear pads as later shown. A plurality of wear pad adjusters 54 may be attached to the impingement sleeve forward ring 50 such as in a spaced apart circular array as shown in FIGS. 2 and 7. In this exemplary embodiment, two wear pad adjusters 54 may be proximate one another with respective seal plates 51A, 51B positioned there between as shown in FIG. 7. Alternate embodiments allow for the number of wear pad adjusters 54 and their respective locations on forward ring 50 to vary as a function of at least the mechanical and thermal loading properties of transition piece 28. This arrangement provides an axially movable coupling assembly 53 which connects the forward end 44 of the impingement sleeve 45 to the transition piece forward outer ring 52 and thereby to the downstream end 56 of the outer wall of the combustion chamber. Coupling assembly 53 may be considered to include an impingement sleeve forward ring 50, a plurality of radial gap adjusters 54 thereon, and a transition piece forward outer ring 52. Herein, the term “axially” means generally parallel to an axis or centerline 82 of the impingement sleeve forward ring 50, parallel to a centerline of the coupling, or parallel to the combustion gas path, which may be generally cylindrical in an exemplary embodiment. Embodiments of the invention may be used with transition pieces 28 having various cross sectional geometries at the forward end, including generally cylindrical or generally rectangular ones, for example.

Figure 3:
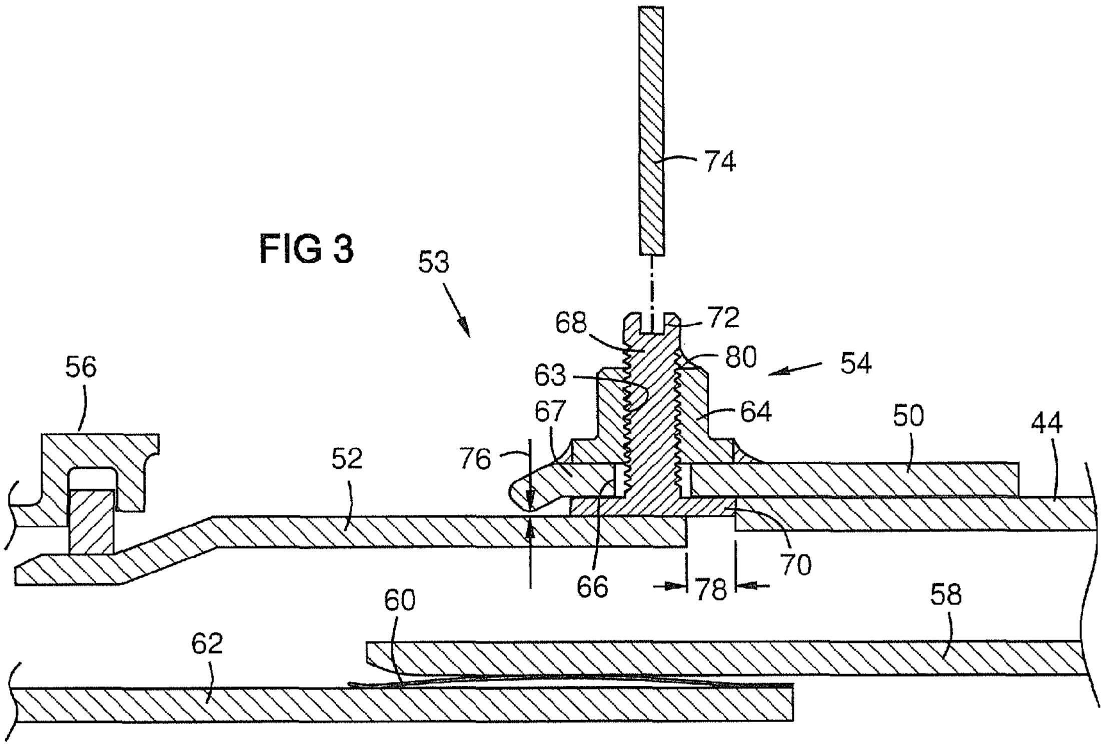
FIG. 3 is a sectional view through an adjuster taken along line 3-3 of FIG. 2.

FIG. 3 is a sectional view of the axially slidable coupling assembly 53 including a wear pad adjuster 54 according to aspects of the invention. The forward outer ring 52 may engage the downstream end 56 of an outer wall of the combustion chamber 26. The transition piece body or inner liner 58 of the transition piece may encircle and slide over an annular spring seal 60 on the inner liner 62 of the combustion chamber 26. A threaded nut 64 may be affixed to the outer surface of the impingement sleeve forward ring 50. The nut 64 may have a threaded hole 63 aligned with a hole 66 in a forward portion 67 of the impingement sleeve forward ring 50. A machine screw 68 may be threaded in the nut 64. The screw 68 has a radially inner end that may include a wear pad 70 formed integrally therewith or attached thereto, and a radially outer end with a turning tool engagement element 72, such as a slot, a flat, or a hex hole or outer hex geometry for a hex wrench 74.

A radial gap 76 between the impingement sleeve forward ring 50 and the transition piece forward outer ring 52 may be adjusted by turning the screw 68. The term "radial" means perpendicular to the centerline 82 of the impingement sleeve forward ring 50. The radial gap adjustment may be locked by welding 80 the screw 68 to the nut 64, or by other means such as a set-screw or lock-nut. An axial gap 78 may be provided between the forward end 44 of the impingement sleeve 45 and an aft end of the transition piece forward outer ring 52 to allow relative axial motion between them.

Figure 4:
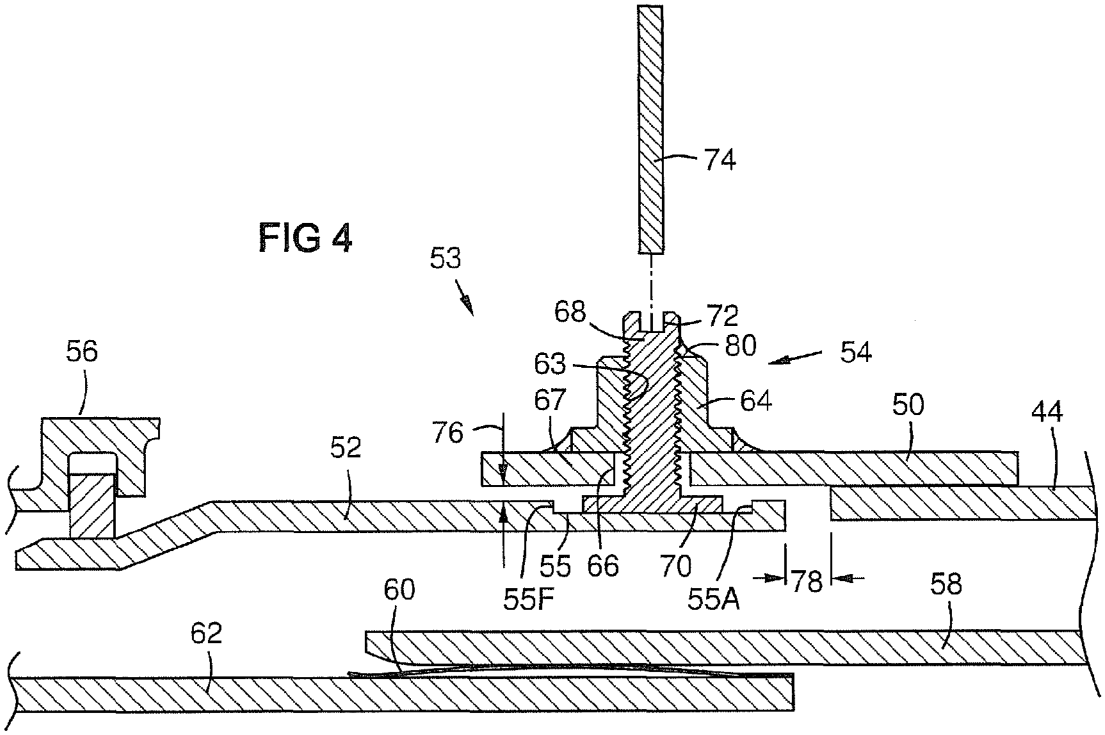
FIG. 4 is a sectional view of an alternate embodiment of the adjuster.

FIG. 4 shows an embodiment of the invention in which the pad 70 seats in a recess 55 in the transition piece forward outer ring 52. An aft wall 55A of the recess 55 may limit the forward movement of the forward outer ring 52 relative to the impingement sleeve 45 by contact of the wear pad 70 against the aft wall 55A. This may retain the forward outer ring 52 in the coupling assembly 53. A forward wall 55F of the recess 55 may limit the aft movement of the forward outer ring 52 relative to the impingement sleeve 45 by contact of the wear pad 70 against the forward wall 55F. The recess 55 may be an annular groove, although this is not a limitation. One skilled in the art will appreciate that other embodiments of the invention may include other structures which allow the gap 76 to be set to a desired distance at locations around the circumference of the forward outer ring 52. While the illustrated embodiment utilizes a nut 64 and screw 68 combination to set a radial location of a wear pad 70, other embodiments may utilize wedge devices, shims, or other user-adjustable mechanisms to establish a displacement limiting controlled-gap connection in a radial direction between the two rings 50/52 while still permitting axial displacement to accommodate thermal growth between the parts.

Figure 5:
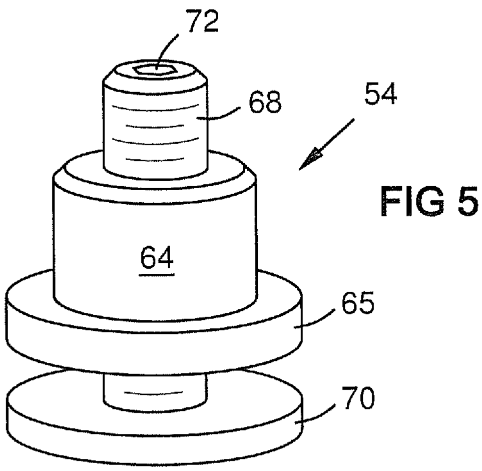
FIG. 5 is a perspective view of an adjuster per aspects of the invention.

FIG. 5 is a perspective view of a wear pad adjuster 54, including a threaded nut 64 and a machine screw 68. The nut 64 may have a flange 65 to facilitate welding to the impingement sleeve forward ring 50. Wear pad 70 is illustrated as an integral part of screw 68. One will appreciate that the wear pad 70 provides a desired contact area size such that forces exerted between the two rings 50/52 are distributed to avoid local deformation. In other embodiments, the radially adjustable device making contact between the two rings 50/52 may provide such a desired contact area without the need for a distinctly defined wear pad. The material of construction and/or surface finish of the wear pad 70 may be selected from among known materials to avoid any problematic wear characteristic during engine operation.

Figure 6:
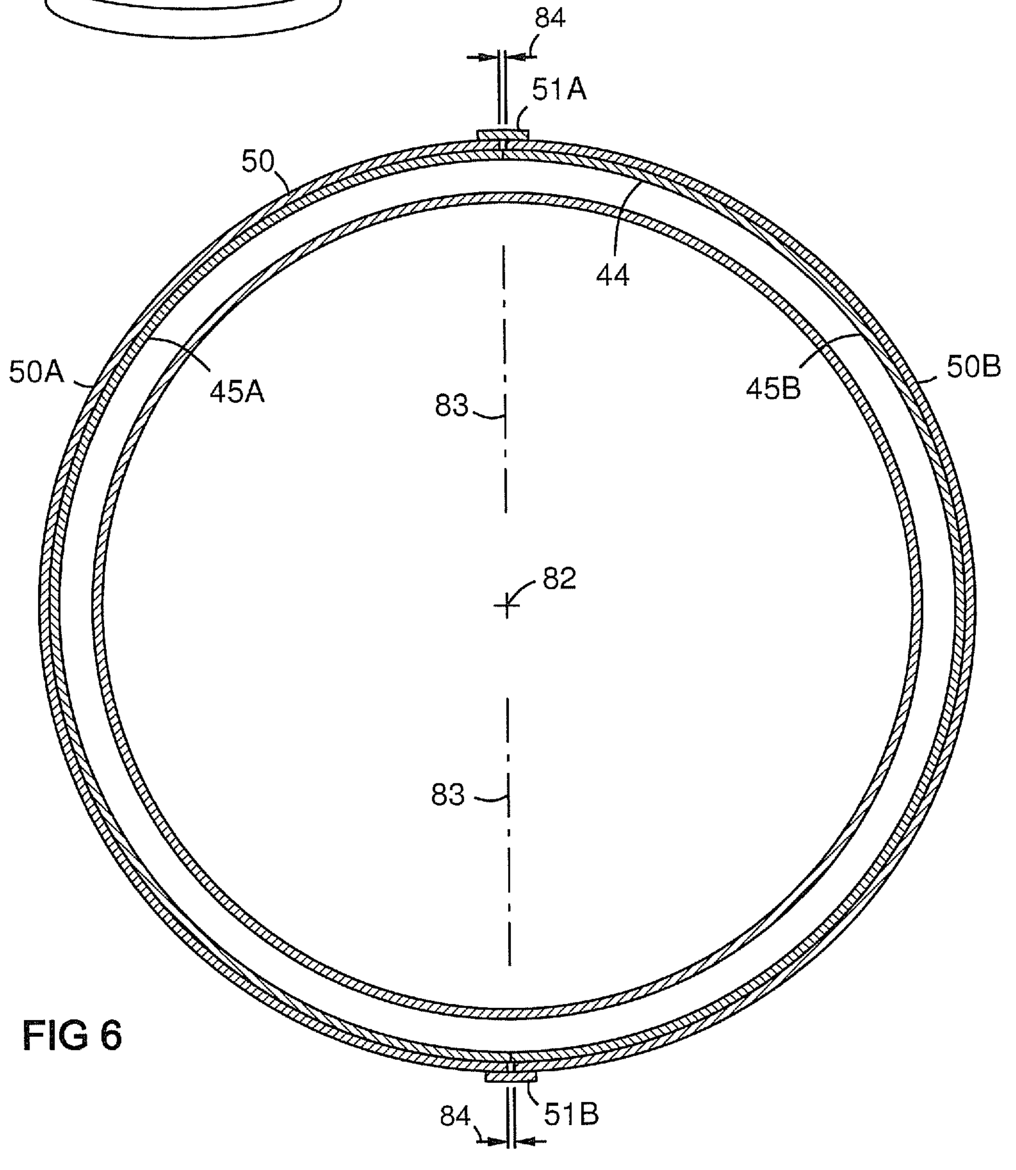
FIG. 6 is a sectional view taken along line 6-6 of FIG. 2.

FIG. 6 is a sectional view taken along line 6-6 of FIG. 2, showing first and second halves 45A, 45B of the impingement sleeve 45, the halves being divided along a vertical axial plane 83. First and second seal plates 51A, 51B may connect the first and second segments 50A, 50B of the impingement sleeve forward ring 50 across circumferential gaps 84.

FIG. 7 is a sectional view taken along line 7-7 of FIG. 2, showing a circular array of spaced apart wear pad adjusters 54 installed on the impingement sleeve forward ring 50. The centerline 82 of the impingement sleeve forward ring 50 is indicated. A vertical axial plane 83 is indicated, meaning a vertical plane that includes the centerline 82. The impingement sleeve forward ring 50 may be formed as two semicircular segments 50A, 50B with a wear pad adjuster 54 at each end as shown. Seal plates 51A, 51B may be welded over the adjacent opposed ends of the segments 50A, 50B to join the segments to form the generally cylindrical transition piece forward ring 50.

Figure 8:
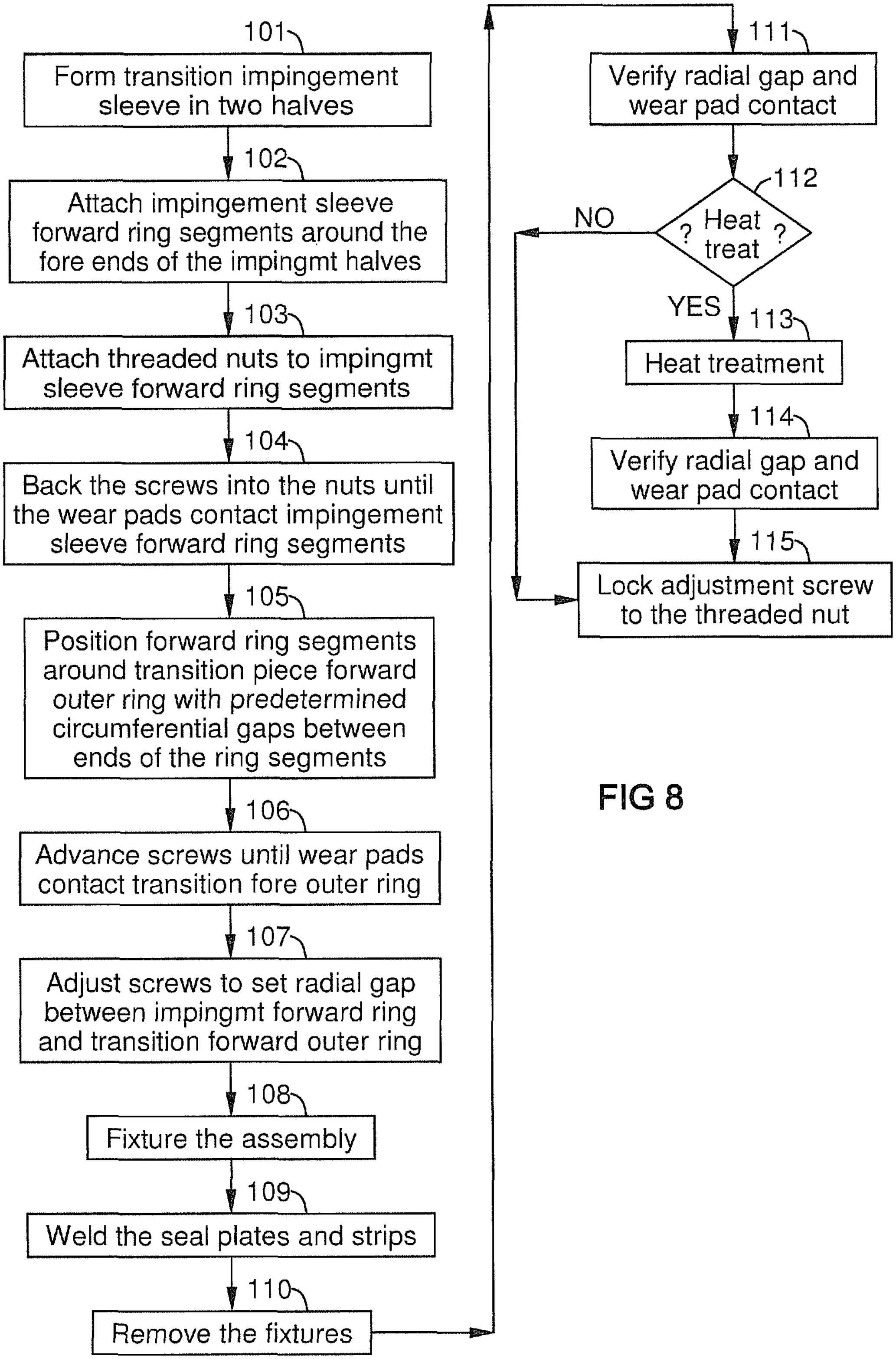
FIG. 8 illustrates a method of assembly according to aspects of the invention.

FIG. 8 illustrates an exemplary assembly method with reference numbers as indicated, including the following steps:

101 Form a transition impingement sleeve in two halves 45A, 45B, which may be divided, for example, along an axial plane.

102 Attach the impingement sleeve forward ring segments 50A, 50B to the respective outer surface of the impingement sleeve halves 50A, 50B for example by welding, so that the forward ring segments 50A, 50B extend forward of the forward edge of the impingement sleeve halves 45A, 45B.

103 Attach the adjuster nuts 64 to the outer surface of the forward ring segments 50A, 50B, for example by welding, so that the threaded holes 63 in the nuts align with the respective holes 66 in the impingement sleeve forward ring segments 50A, 50B. Alternately, this step can be performed before step 102.

104 Back the adjuster screws 68 into the threaded nuts 64 until the wear pads 70 contact the inner surface of the impingement sleeve forward ring segments 50A, 50B.

105 Position segments 50A, 50B around the transition piece forward outer ring 52 while maintaining a predetermined circumferential gap 84 between the ends of the segments 50A, 50B, for example at the top and bottom at the axial plane 83. This gap is maintained for the duration of the assembly.

106 Advance the adjuster screws 68 clockwise until the respective wear pads 70 contact the forward outer ring 52 in the recess 55.

107 Turn the adjuster screws 68 as necessary to set a predetermined radial gap 76 between the forward ring 50 and forward outer ring 52.

108 Fixture the assembly to maintain the part relationships while weld processes are accomplished.

109 Position and weld the seal plates 51A, 51B and the seal strips 47A, 47B.

110 Remove the welding fixtures.

111 Verify that the radial gap 76 has been maintained, and that each adjuster wear pad 70 is still in contact with the bottom of the recess 55.

112 If a post-welding heat treatment is required, step 111 may be repeated 114 after the heat treatment 113 is completed.

115 At the completion of all checks and verifications, weld or otherwise lock the adjuster screw 68 to the threaded nut 64.

Embodiments of the adjustable wear pad allow for adjustment of the radial gap 76 in the slidable coupling assembly 53 during the transition piece 45 assembly process, which allows for eliminating the as-built final gap uncertainty found in the prior art. This reduces combustion system variability and system degradation from dynamic response. The fine adjustment provided by embodiments of the present invention allows in-plane thermal growth between component walls while minimizing out-of-plane deformation.

The fine adjustment facilitated by the adjusters 54 provides uniform contact pressure between the wear pads 70 and the transition piece forward outer ring 52. This reduces deformations in the transition piece forward outer ring 52 and in the impingement sleeve 45 due to non-uniform contact pressure between them. The adjustment may be set precisely to eliminate both excessive pressure that may cause such deformations, and to eliminate gaps between the pads and the forward outer ring 52 at operating temperature. Eliminating gaps eliminates vibrations that may accelerate wear of the contact surfaces, and may create dynamic stresses on other elements of the assembly, such as the welds. Performing the fine adjustment in a fixture prior to welding the halves 45A, 45B of the transition impingement sleeve and the forward ring 50A, 50B together, eliminates variability and excessive tolerances in the final assembly due to accumulated tolerances in the manufacturing and assembly process.

It will be appreciated that aspects of the present invention may be incorporated into a newly manufactured gas turbine engine, and may also be implemented as a retrofit during a repair or maintenance procedure for an in-service gas turbine engine. Existing component parts of an existing engine, such as the impingement sleeve forward ring and/or transition piece forward outer ring, may either be replaced or may be modified and reused during such a retrofit procedure.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A turbine combustion system comprising:

a transition piece impingement sleeve with a forward end;

an impingement sleeve forward ring affixed to and encircling the forward end of the impingement sleeve;

a transition piece forward outer ring having an aft end encircled by the impingement sleeve forward ring and a forward end engaged with a downstream end of an outer wall of a combustion chamber; and a selectively adjustable radial displacement limiting interconnection between the transition piece forward outer ring and the impingement sleeve forward ring, the interconnection being selectively adjustable to establish a controlled radial gap between the transition piece forward outer ring and the impingement sleeve forward ring;

wherein the interconnection further comprises:

a plurality of nuts attached to a radially outer surface of the impingement sleeve forward ring, each nut comprising a radially oriented threaded hole aligned with a respective hole in the impingement sleeve forward ring;

a respective machine screw threaded into each nut, each machine screw comprising a radially inner end comprising a wear pad, and a radially outer end comprising a turning tool engagement element; and the transition piece forward outer ring comprising a surface that contacts a radially inner surface of each of the wear pads;

wherein a rotational position of the machine screw determines the controlled radial gap.

2. The turbine combustion system of claim 1 wherein a forward portion of the impingement sleeve forward ring extends forward of the impingement sleeve, and said respective holes are located in the forward portion of the impingement sleeve forward ring.

3. The turbine combustion system of claim 1 wherein the impingement sleeve forward ring is formed in two semicircular segments welded to the forward end of the impingement sleeve.

4. The turbine combustion system of claim 1 wherein an axial gap is provided between the forward end of the impingement sleeve and the aft end of the transition piece forward outer ring.

5. The turbine combustion system of claim 1 wherein each machine screw is locked at a given rotational position in a respective nut.

6. The turbine combustion system of claim 1 wherein each machine screw is welded to a respective nut.

7. The turbine combustion system of claim 1 wherein the radially inner surface of the wear pad contacts a bottom surface of a recess in a radially outer surface of the transition piece forward outer ring; and wherein the recess limits forward motion of the transition piece forward outer ring relative to the impingement sleeve via contact of the wear pad against an aft wall of the recess.

8. The turbine combustion system of claim 1 wherein the radially inner surface of the wear pad contacts a bottom surface of a recess in a radially outer surface of the transition piece forward outer ring;

wherein the recess limits aft motion of the transition piece forward outer ring relative to the impingement sleeve via contact of the wear pad against a forward wall of the recess.

9. A turbine combustion system comprising:

an impingement sleeve forward ring;

a transition piece forward outer ring comprising an aft portion surrounded by the transition impingement sleeve forward ring and separated therefrom by a radial gap;

a nut affixed to an outer surface of the impingement sleeve forward ring, wherein the nut comprises a threaded hole aligned with a hole in the impingement sleeve forward ring;

a screw threaded into the threaded hole; and a wear pad is affixed to a radially inner end of the screw contacting an outer surface of a transition piece forward outer ring;

wherein a rotational position of the screw sets and controls the radial gap between the impingement sleeve forward ring and the transition piece forward outer ring.

10. The turbine combustion system of claim 9 wherein the screw is locked at a given rotational position in the nut.

11. The turbine combustion system of claim 9 wherein the screw is welded to the nut.

12. The turbine combustion system of claim 9, further comprising an annular recess in the outer surface of the transition piece forward outer ring for receiving the wear pad such that the wear pad contacts a bottom surface of the recess.

13. The turbine combustion system of claim 12, wherein the recess comprises forward and aft walls that limit a relative axial motion of the wear pad.

14. The turbine combustion system of claim 9, further comprising a turning tool engagement element formed on a radially outer end of the screw.

15. A method of assembling a turbine combustion system, comprising:

providing a plurality of generally radially-oriented adjustment screws around an impingement sleeve forward ring attached around and extending forward from a forward end of an impingement sleeve; and turning the adjustment screws to set a radial gap between the impingement sleeve forward ring and a transition piece forward outer ring that is surrounded by the impingement sleeve forward ring;

wherein a wear pad on a radially inner end of each of the adjustment screws contacts the transition piece forward outer ring to set the radial gap.

16. The method of claim 15, further comprising:

forming the impingement sleeve in two halves;

forming the impingement sleeve forward ring in two segments;

attaching the impingement sleeve forward ring segments to an outer surface of the impingement sleeve halves, wherein the impingement sleeve forward ring segments extend forward of a forward edge of the impingement sleeve halves;

attaching a plurality of threaded nuts to an outer surface of the forward ring segments forward of the forward edge of the impingement sleeve halves, wherein threaded holes in the threaded nuts align with respective holes in the impingement sleeve forward ring segments;

backing the adjustment screws into the threaded nuts until the wear pads contact an inner surface of the impingement sleeve forward ring segments;

positioning the impingement sleeve forward ring segments around the transition piece forward outer ring while maintaining a predetermined circumferential gap between opposed ends of the impingement sleeve forward ring segments;

turning the adjustment screws to advance them radially inwardly until each wear pad contacts the transition piece forward outer ring;

turning the adjustment screws effective to set a predetermined radial gap between the impingement sleeve forward ring and transition piece forward outer ring;

fixturing the impingement sleeve halves, the impingement sleeve forward ring segments, and the transition piece forward outer ring while weld process are performed;

welding seal plates across the opposed ends of the impingement sleeve forward ring segments;

welding seal strips along opposed edges of the impingement sleeve halves; and removing the welding fixturing; and locking the adjustment screws to the threaded nuts.

17. The method of claim 16, further comprising:

after welding the seal strip and the seal plates, verifying that the predetermined radial gap is maintained, and verifying that each adjuster wear pad is still in contact with the transition piece forward outer ring;

heat-treating at least the seal strips and the seal plates;

verifying again that the predetermined radial gap is maintained, and verifying again that each adjuster wear pad is still in contact with the transition piece forward outer ring; and welding the adjustment screws to the threaded nuts.

* * * * *